US010425796B2

(12) United States Patent
Han et al.

(10) Patent No.: US 10,425,796 B2
(45) Date of Patent: Sep. 24, 2019

(54) RADIO ACCESS TECHNOLOGY SEARCHING METHOD AND APPARATUS FOR EMERGENCY CALL IN TERMINAL SUPPORTING A PLURALITY OF COMMUNICATION NETWORKS

(71) Applicant: Samsung Electronics Co., Ltd., Suwon-si, Gyeonggi-do (KR)

(72) Inventors: Yong-Gil Han, Gumi-si (KR); Shin-Duck Lee, Gyeongju-si (KR); Hyun-Chul Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 15/664,500

(22) Filed: Jul. 31, 2017

(65) Prior Publication Data

US 2017/0332224 A1 Nov. 16, 2017

Related U.S. Application Data (63) Continuation of application No. 14/068,376, filed on Oct. 31, 2013, now abandoned.

(30) Foreign Application Priority Data

Nov. 2, 2012 (KR) .................. 10-2012-0123592

(51) Int. Cl.
| | |
|---|---|
| *H04W 4/90* | (2018.01) |
| *H04W 48/16* | (2009.01) |
| *H04W 76/50* | (2018.01) |
| *H04W 48/18* | (2009.01) |

(52) U.S. Cl.
CPC ............. *H04W 4/90* (2018.02); *H04W 48/16* (2013.01); *H04W 48/18* (2013.01); *H04W 76/50* (2018.02)

(58) Field of Classification Search
None
See application file for complete search history.

(56) References Cited

U.S. PATENT DOCUMENTS

| | | | |
|---|---|---|---|
| 6,125,283 A | 9/2000 | Kolev et al. | |
| 2006/0121877 A1* | 6/2006 | Raghuram ............... | H04W 4/90 455/404.2 |
| 2006/0258389 A1* | 11/2006 | Saito ....................... | H04M 1/66 455/550.1 |
| 2007/0155363 A1* | 7/2007 | Rager ...................... | H04M 3/38 455/410 |

(Continued)

FOREIGN PATENT DOCUMENTS

| | | |
|---|---|---|
| CN | 1115070 C | 7/2003 |
| CN | 101222676 A | 7/2008 |

(Continued)

*Primary Examiner* — Hilina K Demeter
(74) *Attorney, Agent, or Firm* — Jefferson IP Law, LLP (57) ABSTRACT

A method and an apparatus for performing a Radio Access Technology (RAT) search for an emergency call in a terminal supported by a plurality of communication networks are provided. The method includes identifying at least one communication network which supports a voice telecommunication among the plurality of communication networks providing support in a communication-limited state in which the communication function of the terminal is limited, and performing the RAT search for the identified at least one communication network.

20 Claims, 4 Drawing Sheets

(56) References Cited

U.S. PATENT DOCUMENTS

| | | | |
|---|---|---|---|
| 2008/0214240 A1* | 9/2008 | Choi | H04W 4/90 455/558 |
| 2008/0233931 A1* | 9/2008 | Shim | H04W 4/90 455/414.3 |
| 2010/0015942 A1* | 1/2010 | Huang | H04M 1/66 455/404.1 |
| 2010/0054209 A1* | 3/2010 | Mahdi | H04W 36/0022 370/331 |
| 2010/0128853 A1* | 5/2010 | Karnalkar | H04W 4/90 379/39 |
| 2011/0014892 A1 | 1/2011 | Hedman et al. | |
| 2011/0028120 A1* | 2/2011 | Wu | H04W 36/0022 455/404.1 |
| 2011/0141910 A1 | 6/2011 | Rosik | |
| 2011/0143703 A1* | 6/2011 | Seo | H04W 48/18 455/404.1 |
| 2011/0183694 A1* | 7/2011 | Han | H04W 48/16 455/507 |
| 2012/0020290 A1 | 1/2012 | Kanauchi et al. | |
| 2012/0134345 A1* | 5/2012 | Tamhankar | H04W 48/18 370/338 |
| 2013/0078940 A1* | 3/2013 | Patil | H04W 76/50 455/404.1 |

FOREIGN PATENT DOCUMENTS

| | | |
|---|---|---|
| CN | 102138345 A | 7/2011 |
| EP | 1 078 541 B1 | 10/2005 |
| EP | 1944997 A2 | 7/2008 |
| EP | 2 334 120 A1 | 6/2011 |
| WO | 2012/074837 A2 | 6/2012 |

* cited by examiner

RADIO ACCESS TECHNOLOGY SEARCHING METHOD AND APPARATUS FOR EMERGENCY CALL IN TERMINAL SUPPORTING A PLURALITY OF COMMUNICATION NETWORKS

PRIORITY

This application is a continuation application of prior application Ser. No. 14/068,376, filed on Oct. 31, 2013, and claimed the benefit under 35 U.S.C. § 119(a) of a Korean patent application filed on Nov. 2, 2012 in the Korean Intellectual Property Office and assigned Serial No. 10-2012-0123592, the entire disclosure of which is hereby incorporated by reference.

TECHNICAL FIELD

The present disclosure relates to a Radio Access Technology (RAT) searching method and apparatus. More particularly, the disclosure relates to an RAT searching method and apparatus for an emergency call.

BACKGROUND

With application of various communication network technologies, each of recently released terminals includes a communication module for supporting a plurality of communication networks. According to the related art, a terminal using a Global System for Mobile communication (GSM), a Universal Mobile Telecommunication System (UMTS), or a Long Term Evolution (LTE) networks among the communication networks has inserted therein a Subscriber Identity Module (SIM) card including a user's personal information. The terminal obtains user information from the inserted SIM card. When the user is determined as a rightful (e.g., authorized) user registered in a network, the terminal performs normal operations.

Therefore, when the SIM card has not been inserted in the terminal using the communication network, the terminal cannot obtain subscriber information and, consequently, the terminal cannot perform a normal communication function. Therefore, the terminal according to the related art is designed so that the terminal can perform an emergency call in preparation for an emergency case. For example, even when a SIM card is not inserted in the terminal according to the related art, the terminal may perform an emergency call. Similarly, when the terminal according to the related art is in a Personal Identity Number (PIN) lock state and a PIN Unlock Key (PUK) lock state, the functions of the terminal are limited. According to the related art, the terminal searches a cell of a network which the terminal can support in order to find an optimal channel for transmitting an emergency call signal. Such a process of searching the cell of the network is referred to as an RAT search.

The RAT search according to the related art is performed in all communication networks for which a terminal can support. This process is illustrated in FIG. 1.

Figure 1:
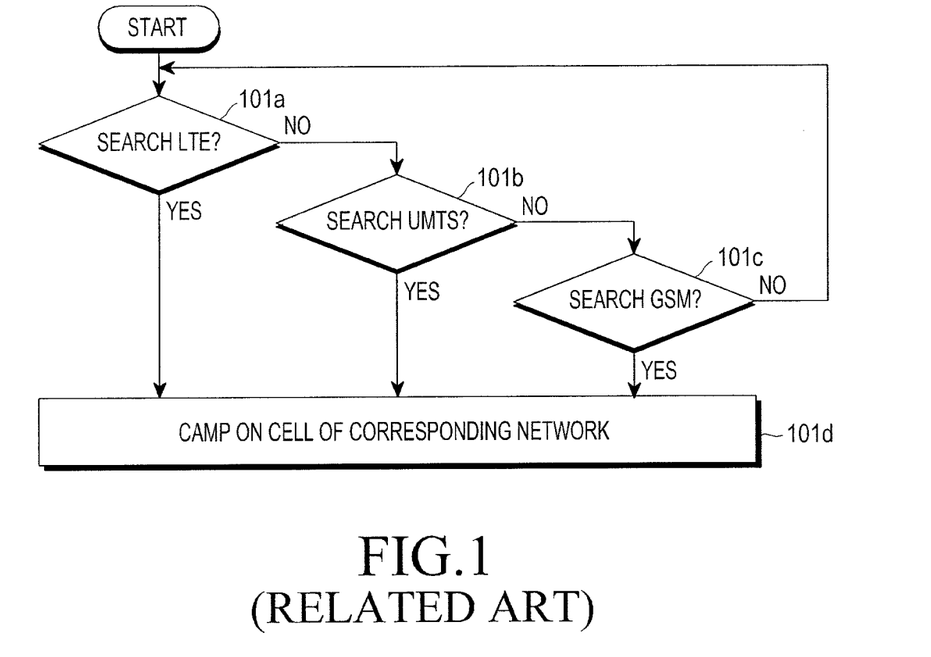
FIG. 1 is a flowchart illustrating an example of a Radio Access Technology (RAT) searching method according to the related art.

FIG. 1 is a flowchart illustrating an example of the RAT searching method according to the related art.

Referring to FIG. 1, a case in which a terminal supports LTE, UMTS, or GSM communication networks is illustrated.

The terminal performs the RAT search according to a predetermined search sequence. When a SIM card has not been inserted into the terminal, the terminal performs the RAT search according to an RAT priority stored in the terminal. When the terminal is in the PIN lock state or the PUK lock state, the terminal performs the RAT search based on information of Registered Public Land Mobile Network (RPLMN) and Registered RAT (RRAT) which are stored in the SIM card. When the RAT priorities stored in the terminal or the SIM card are in the sequence of the LTE network, the UMTS network, and the GSM network.

In operation 101a, the terminal searches for an LTE network. If the terminal discovers an LTE network at the first search in operation 101a, then the terminal proceeds to operation 101d in which the terminal camps on a cell of the LTE network.

In contrast, when an LTE network is not discovered in operation 101a, then the terminal proceeds to operation 101b in which the terminal performs the RAT search a UMTS network.

If the terminal discovers a UMTS network in operation 101b, then the terminal proceeds to operation 101d in which the terminal camps on a cell of the UMTS network.

In contrast, when the terminal does not discover a UMTS network in operation 101b, the terminal proceeds to operation 101c in which the terminal searches for a GSM network.

If the terminal discovers the GSM network in operation 101c, then the terminal proceeds to operation 101d in which the terminal camps on a cell of the GSM network.

In contrast, when the terminal does not discover the GSM network in operation 101c, the terminal returns to operation 101a.

Meanwhile, the LTE network employs a Packet Switching (PS) scheme. However, in the PS scheme, a voice telecommunication is not supported so that an emergency call is impossible. Accordingly, when the terminal camps on an LTE network, the terminal should re-perform the RAT search for a communication network other than the LTE network, for the emergency call. The time required for the re-performing of the RAT search hampers the usefulness of an emergency call prepared for an emergency situation.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a scheme for rapidly performing a Radio Access Technology (RAT) search for an emergency call.

Other aspects of the present disclosure can be appreciated through embodiments described below.

In accordance with an aspect of the present disclosure, a method of performing a Radio Access Technology (RAT) search for an emergency call in a terminal supported by a plurality of communication networks is provided. The method includes identifying at least one communication network which supports a voice telecommunication among the plurality of communication networks providing support in a communication-limited state in which the communication function of the terminal is limited, and performing the RAT search for the identified at least one communication network.

In accordance with an aspect of the present disclosure, an apparatus for performing a Radio Access Technology (RAT) search for an emergency call in a terminal supported by a plurality of communication networks is provided. The apparatus includes a communication unit which supports the plurality of communication networks, and a controller which identifies at least one communication network which supports a voice telecommunication among the plurality of communication networks providing support in a communication-limited state in which the communication function of the terminal is limited and performs the RAT search for the identified at least one communication network.

In accordance with an aspect of the present disclosure, a method of performing a Radio Access Technology (RAT) search for an emergency call in a terminal supported by a plurality of communication networks is provided. The method includes receiving an input corresponding to a request to perform an emergency call, identifying at least one communication network which supports a voice telecommunication among the plurality of communication networks which the terminal supports in a communication-limited state in which the communication function of the terminal is limited, and performing the RAT search for the identified at least one communication network.

Another aspect of the present disclosure is to prevent camping on a communication network which cannot be used for an emergency call, (e.g., a communication network which does not support voice telecommunication) by limiting RAT searching targets for the emergency call to communication networks which support voice telecommunication. An advantage according to aspects of the present disclosure, is the possibility to reduce time and power required to camp on an unnecessary communication network.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of various embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As described above, when a terminal has camped on a communication network which does not support a voice telecommunication in a particular situation in which a communication function of the terminal is limited, the terminal should search for and then re-camp on a communication network supporting a voice telecommunication for an emergency call. In this event, time wasted for re-performing the RAT search is incongruent the purpose of the emergency call.

Accordingly, the present disclosure provides a scheme in which communication networks which do not support the voice telecommunication are excluded from targets of the RAT search when performing the RAT search for the emergency call.

The following description of various embodiments of the present disclosure is based on an assumption that the terminal supports two or more communication networks. It is also assumed that the terminal includes a communication module for at least one communication network which supports a voice telecommunication and a communication module for at least one communication network which does not support a voice telecommunication.

Hereinafter, various embodiments of the present disclosure will be described with reference to the accompanying drawings.

First, an RAT searching method according to an embodiment of the present disclosure will be described with reference to FIGS. 2A to 2C.

Figure 2A:
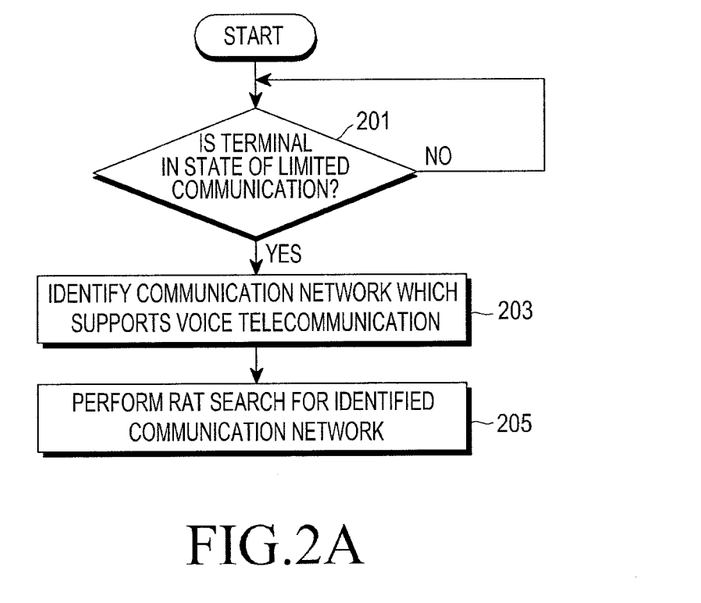
FIGS. 2A to 2C are flowcharts illustrating examples of an RAT searching method according to an embodiment of the present disclosure.
Figure 2B:
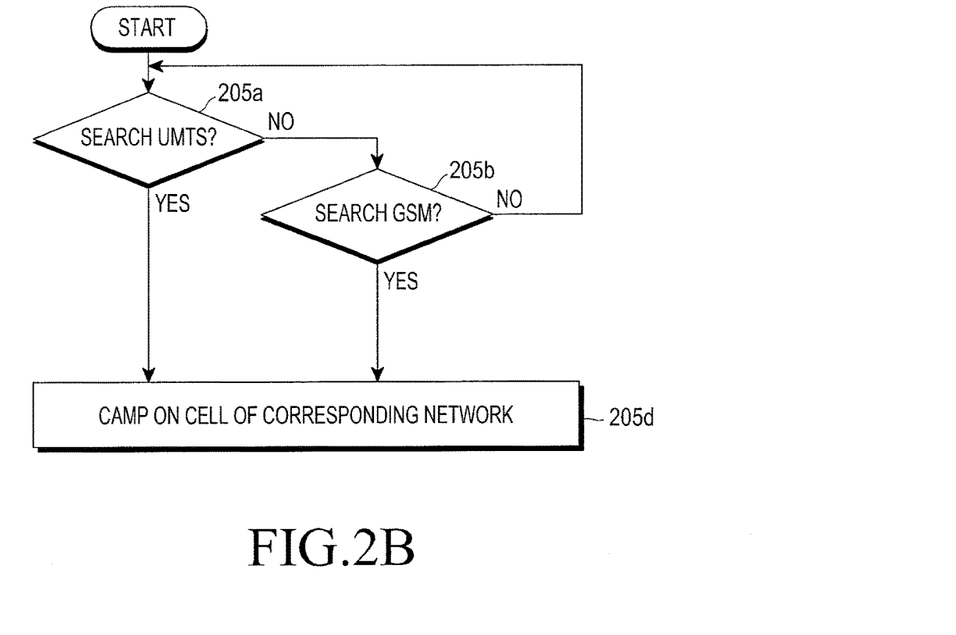
Figure 2C:
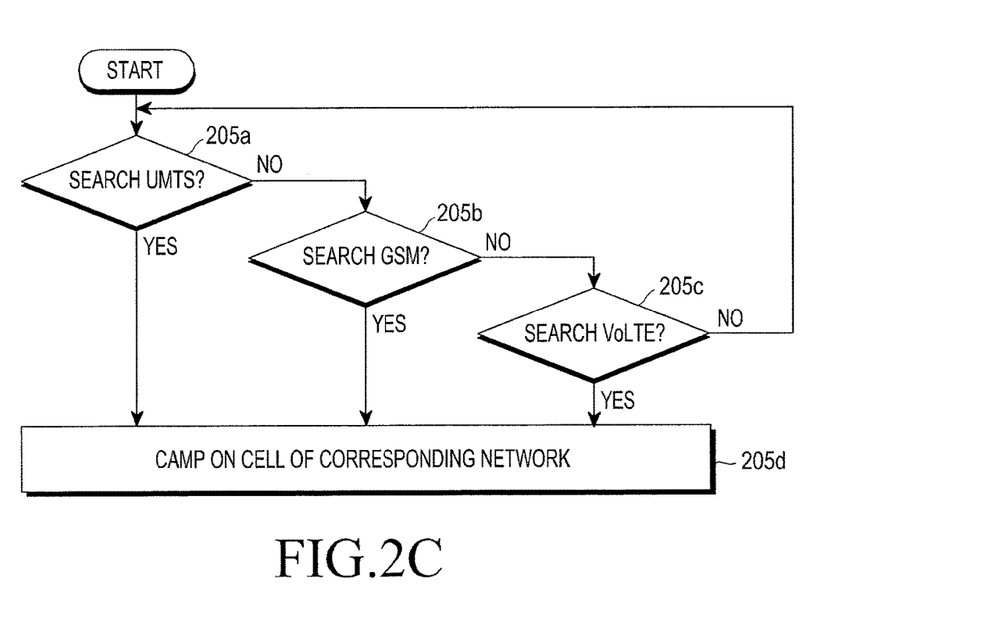
Figure 3:
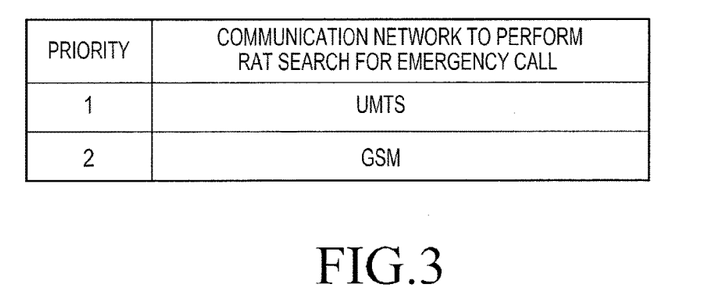
FIG. 3 illustrates a table showing an example of a communication network for an RAT search according to an embodiment of the present disclosure.

FIGS. 2A to 2C are flowcharts illustrating examples of the RAT searching method according to an embodiment of the present disclosure. FIG. 3 illustrates a table showing an example of a communication network for the RAT search according to an embodiment of the present disclosure.

Referring to FIGS. 2A to 2C, the embodiment described with reference there to is based on a case in which a SIM card is not inserted in a terminal.

In operation 201, the terminal determines whether the terminal is in a communication-limited state in which the communication function of the terminal is limited.

When the terminal determines that the terminal is in the communication-limited state in operation 201, the terminal proceeds to operation 203. Herein, the communication-limited state in which the communication function of the terminal is limited refers to, for example, a case in which the SIM card is not mounted.

In operation 203, the terminal identifies a communication network which supports a voice communication among communication networks which the terminal can support. The identification may be implemented with reference to a predetermined table. For example, the identification may be implemented with reference to the predetermined table distinguishing between a network which supports a voice telecommunication and a network which does not support a voice telecommunication among communication networks which the terminal can support. Further, as illustrated in FIG. 3, the identification may be implemented with reference to a table in which communication networks desired to be used at the time of performing the RAT search for the emergency call are defined. According to various embodiments, the terminal may identify a plurality of communication networks each of which supports voice communication.

Herein, the communication network supporting the voice telecommunication may refer to, for example, a communication network employing a Circuit Switched (CS) scheme. For example, the communication network employing the CS scheme may be a UMTS network or the GSM network.

Meanwhile, the communication network which does not support the voice telecommunication may refer to, for example, a communication network employing a Packet Switching (PS) scheme. For example, the communication network employing the PS scheme may be, for example, an LTE network. However, a Voice over LTE (VoLTE) employs the PS scheme and also supports the voice telecommunication.

In operation 205, the terminal performs the RAT search for the identified communication network (e.g., a communication network which supports the voice telecommunication). For example, the terminal performs the RAT search for the communication network which does not support the voice telecommunication among the communication networks which the terminal can support (e.g., remaining communication networks except for the LTE network). The RAT searching method will be described in more detail with reference to FIG. 2B.

FIG. 2B illustrates a case in which a terminal supports LTE, UMTS, and GSM networks. In the embodiment described with reference to FIG. 2B, it is assumed that the LTE network does not support the VoLTE.

Referring to FIG. 2A, the terminal excludes the communication network which does not support a voice telecommunication (e.g., the LTE network), from targets of the RAT search. Therefore, the terminal performs the RAT search for the UMTS and GSM networks which are communication networks which support the voice telecommunication. The RAT search may be implemented based on a predetermined priority. For example, as illustrated in FIG. 3, each communication network desired to be used at a time of the RAT search may have a predefined priority. In this event, the terminal sequentially performs the RAT search based on the predefined priority. The priority may be predefined or selected by a user or a system designer.

According to the predefined (e.g., selected) priority, the terminal performs the RAT search in the sequence of the UMTS and the GSM. For example, the terminal performs the RAT search in the sequence of the UMTS and the GSM. Further, the terminal camps on a cell of a discovered network.

In operation 205a, the terminal searches for a UMTS network. If the terminal discovers a UMTS network in operation 205a, the terminal proceeds to operation 205d in which the terminal camps on the UMTS network.

In contrast, when the terminal does not discover a UMTS network in operation 205a, the terminal proceeds to operation 205b in which the terminal searches for the GSM network.

If the terminal discovers the GSM network in operation 205b, the terminal proceeds to operation 205d in which the terminal camps on the GSM network.

In contrast, when the terminal does not discover the GSM network in operation 205b, the terminal returns to operation 205a.

As illustrated in FIG. 2B, when one communication network has been discovered, the RAT search for a communication network including a lower priority may not be executed. Meanwhile, there may be a plurality of cells corresponding to the discovered networks. In this event, the terminal may select a cell to be camped on based on a Received Signal Strength Indicator (RSSI) of each cell.

Meanwhile, the LTE network may be a network which supports the VoLTE. In this event, the LTE network may be included in targets of the RAT search because such a network can support the voice telecommunication. This embodiment is illustrated in FIG. 2C.

Referring to FIG. 2C, the terminal performs the RAT search for the communication network which supports the voice communication. In this event, because the LTE network which supports the VoLTE supports the voice communication, the LTE network may be included in targets of the RAT search.

Accordingly, when the communication networks desired to be used at a time of the RAT search have priorities predetermined in the sequence of the UMTS network and the GSM network and the LTE network (which supports the VoLTE), the terminal performs the RAT search in the sequence of the UMTS network, the GSM network, and the LTE network (which supports the VoLTE) according to the predetermined priorities. Further, the terminal camps on a cell of a discovered network.

In operation 205a, the terminal searches for the UMTS network. If the terminal discovers the UMTS network in operation 205a, the terminal proceeds to operation 205d in which the terminal camps on the UMTS network.

In contrast, when the terminal does not discover the UMTS network in operation 205a, the terminal proceeds to operation 205b in which the terminal searches for the GSM network.

If the terminal discovers the GSM network in operation 205b, the terminal proceeds to operation 205d in which the terminal camps on the GSM network.

In contrast, when the terminal does not discover the GSM network in operation 205b, the terminal proceeds to operation 205c in which the terminal searches for the VoLTE network.

If the terminal discovers the VoLTE network in operation 205c, the terminal proceeds to operation 205d in which the terminal camps on the VoLTE network.

In contrast, when the terminal does not discover the VoLTE network in operation 205c, the terminal returns to operation 205a.

The above description with reference to FIGS. 2A to 3 discusses the RAT searching method of a case in which the SIM card is not inserted in the terminal Hereinafter, the RAT searching method of a case in which the terminal is in the PIN lock state or the PUK lock state will be described with reference to the accompanying drawings.

Figure 4:
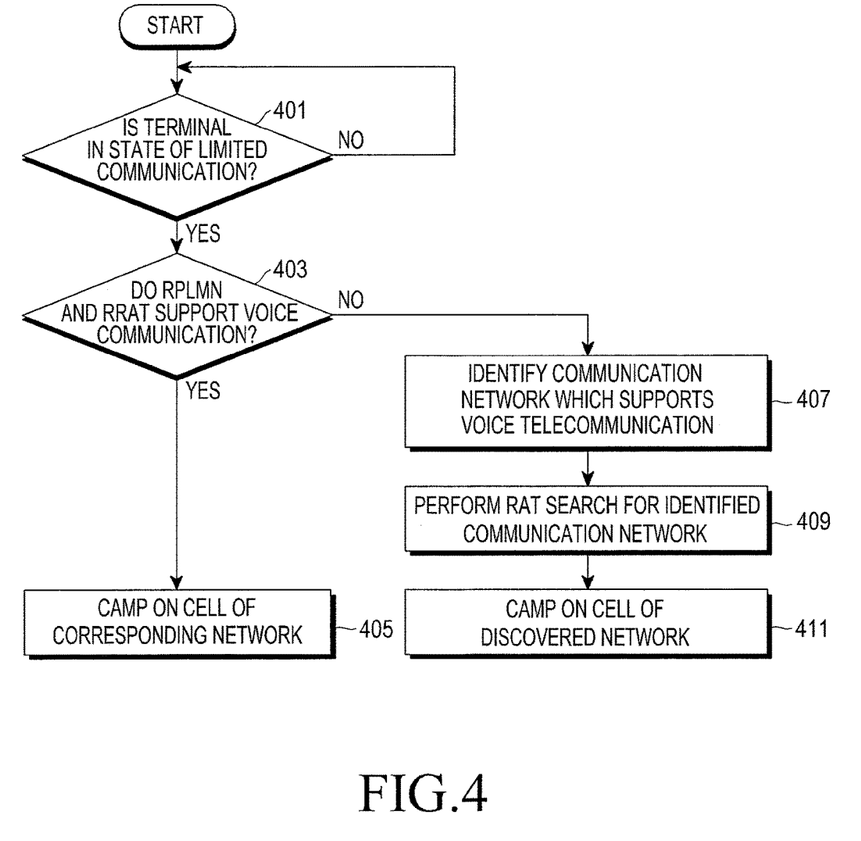
FIG. 4 is a flowchart illustrating an example of an RAT searching method according to an embodiment of the present disclosure.

FIG. 4 is a flowchart illustrating an example of the RAT searching method according to an embodiment of the present disclosure.

In operation 401, the terminal determines whether the terminal is in a communication-limited state in which the communication function of the terminal is limited.

When the terminal determines that the terminal is in the communication-limited state in operation 401, the terminal proceeds to operation 403. Herein, the communication-limited state refers to, for example, a case in which the terminal is in the PIN lock state or the PUK lock state. The PIN lock state refers to a state in which a lock code of the SIM card itself has been activated. Further, the PUK state refers to a state in which a code input for a release of the PIN lock has been erroneously input more than a preset number of times.

When the terminal determines that the terminal is not in the communication-limited state in operation 401, the terminal may continue to poll for an indication that the terminal enters the communication-limited state.

In operation 403, the terminal determines whether a most recently used network supports the voice telecommunication with reference to information stored in the SIM card. For example, the terminal may refer to RPLMN in formation, RRAT information, and the like for determination as to whether the most recently used network supports the voice telecommunication.

When the terminal determines that the RAT used in the RPLMN (e.g., the RRAT is a network which supports the voice telecommunication), the terminal proceeds to operation 405 in which the terminal camps on a cell of a corresponding network.

In contrast, when the terminal determines that the most recently used network is a network which does not support the voice telecommunication in operation 403, the terminal proceeds to operation 407 in which the terminal identifies the communication network which supports the voice communication. As described above in relation to operation 203 of FIG. 2A, the identification may be implemented with reference to a predetermined table distinguishing between the network which supports the voice telecommunication and the network which does not support the voice telecommunication among communication networks which the terminal can support. Otherwise, as illustrated in FIG. 3, the identification of communication networks desired to be used at a time of the RAT search for an emergency call may be implemented with reference to the predetermined table.

In operation 409, the terminal performs the RAT search in the identified communication networks (e.g., the communication networks which support the voice communication). As described above with reference to FIGS. 2B and 2C, the search may be implemented based on the predefined (e.g., selected) priority. Further, as a result of the search, when one network has been discovered, the terminal proceeds to operation 411.

In operation 411, the terminal camps on a cell of the discovered network.

According to various embodiments as described above, there is an advantage in that the terminal can rapidly camp on the communication network which supports the voice telecommunication by excluding the communication network which does not support the voice communication from targets of the RAT search, at a time of performing the RAT search for the emergency call. Further, there is an advantage of reducing unnecessary power consumption by preventing the terminal from unnecessarily camping on the communication network which does not support the voice communication.

The RAT searching method according to the embodiment of the present disclosure has been discussed above with reference to FIGS. 2A to 4. Hereinafter, the RAT searching apparatus according to an embodiment of the present disclosure will be described with reference to the related drawings.

Figure 5:
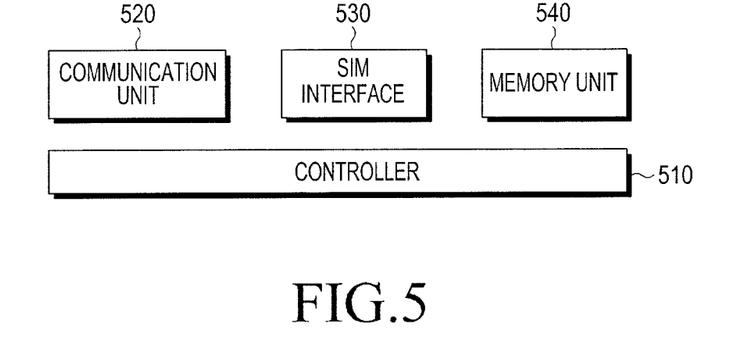
FIG. 5 is a block diagram illustrating an RAT searching apparatus according to an embodiment of the present disclosure.

FIG. 5 is a block diagram illustrating an RAT searching apparatus according to an embodiment of the present disclosure.

Referring to FIG. 5, the RAT searching apparatus according to various embodiments includes a controller 510, a communication unit 520, a SIM interface 530, and a memory unit 540.

In a communication-limited state in which the communication function of the terminal is limited, the controller 510 identifies at least one communication network which supports the voice telecommunication among a plurality of communication networks which the terminal supports, and then performs the RAT search for the identified at least one communication network. The communication-limited state may be the SIM card un-mounted state, the PIN lock state, the PUK lock state, and/or the like.

In addition, an identification of at least one communication network which supports the voice communication may be implemented with reference to a predefined table (e.g., the RAT search table in which communication networks desired to perform the RAT search for an emergency call are defined). Further, the controller 510 performs the RAT search based on the predefined priority assigned to the plurality of communication networks at a time of performing the RAT search. The predefined priority may be predefined in the table described above.

When one communication network among the plurality of communication networks has been discovered, the controller 510 camps on a cell of a corresponding communication network. In this event, when the discovered communication network has a plurality of cells, the controller 510 may select a cell to be camped on based on a predetermined condition. For example, the controller 510 may select a cell to be camped on based on a Received Signal Strength Indicator (RSSI) of each cell. When the cell to be camped on is determined, the controller 510 camps on the corresponding cell.

Meanwhile, when the terminal is determined to be in the PIN lock state or the PUK lock state, the controller 510 may determine whether a most recently used network is a network which supports the voice telecommunication, based on information stored in the SIM card (e.g., RPLMN and RRAT information), before identifying at least one communication network which supports the voice communication among the plurality of communication networks which the terminal supports. When the most recently used network is determined to be a network which does not support the voice telecommunication, the controller 510 may identify the at least one communication network which supports the voice telecommunication. When the most recently used network is determined to be a network which supports the voice telecommunication, the controller 510 camps on a cell of the most recently used network.

The communication unit 520 includes a communication interface supporting a plurality of communication networks. For example, the communication network 520 may include a communication module capable of communicating with at least one communication network which supports the voice telecommunication and a communication module capable of communicating with at least one communication network which does not support the voice telecommunication.

The SIM interface 530 includes an insert unit in which the SIM card can be detachably inserted. The SIM interface 530 transfers information between the terminal and the SIM card.

The memory unit 540 stores information of the communication network for the RAT search for the emergency call. For example, the memory unit 540 stores information of the communication network which supports the voice telecommunication among the plurality of communication networks which the terminal supports. The memory unit 540 may store priorities of communication networks supporting the voice communication, wherein the priorities determine the sequence for prior searching between the communication networks at the time of performing the RAT search, in combination with corresponding communication networks.

The embodiments of the present disclosure as described above may be implemented by various arbitrary methods. For example, various embodiments may be implemented by using hardware, software, or a combination of hardware and software. When various embodiments are implemented as software, it is possible to implement the software as being performed on one more processor using another operating system or a platform. Additionally, the software as described above may be programmed by using an arbitrary language among a plurality of suitable programming languages and be compiled by a dispatchable machine language code or an intermediate code being performed in a framework or a virtual machine.

Also, when various embodiments are implemented on one more processer, the various embodiments may be implemented by non-transitory a processer-readable mediums (e.g., a memory, a floppy disc, a compact disc, an optical disk, and a magnetic tape) in which one more program for performing a method for implementing the various embodiments of the present disclosure as described above are recorded.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of performing a Radio Access Technology (RAT) search for an emergency call in a terminal supported by a plurality of communication networks, the method comprising:
   receiving an input corresponding to a request to perform an emergency call;
   in response to the receiving of the input, prior to performing the RAT search for the emergency call, determining whether a Subscriber Identity Module (SIM) card has been mounted to the terminal;
   in response to determining that the SIM card has been mounted to the terminal, performing the RAT search for at least one communication network based on an RAT priority stored in the terminal; and
   in response to determining that the SIM card has not been mounted to the terminal, determining at least one communication network which supports a voice telecommunication among the plurality of communication networks which the terminal supports in a communication-limited state in which a communication function of the terminal is limited, the determination excluding one or more communication networks which do not support the voice telecommunication among the plurality of communication networks, and performing the RAT search for the determined at least one communication network.

2. The method of claim 1, wherein the communication-limited state corresponds to at least one of a SIM card un-mounted state, a Personal Identification Number (PIN) lock state, or a PIN Unlock Key (PUK) lock state.

3. The method of claim 2, further comprising:
   when the communication-limited state corresponds to at least one of the PIN lock state or the PUK lock state, determining whether a most recently used network is a network which supports a Circuit Switched (CS) voice telecommunication, based on information stored in the SIM card; and
   when the most recently used network is a network which does not support the CS voice telecommunication, determining the at least one communication network which supports the CS voice telecommunication.

4. The method of claim 3, wherein, when the most recently used network is determined to support the CS voice telecommunication, the performing of the RAT search for the determined at least one communication network comprises performing the RAT search for the most recently used network.

5. The method of claim 3, wherein the at least one communication network which supports the Circuit Switched (CS) voice telecommunication comprises a communication network employing a CS scheme.

6. The method of claim 1, wherein the performing of the RAT search is implemented based on priorities assigned to the plurality of communication networks.

7. The method of claim 6, further comprising:
   after performing the RAT search, camping on a cell of a corresponding communication network when the corresponding communication network is discovered among the plurality of communication networks.

8. A non-transitory computer-readable storage medium storing instructions, that when executed, cause at least one processor to perform the method of claim 1.

9. An apparatus for performing a Radio Access Technology (RAT) search for an emergency call in a terminal supported by a plurality of communication networks, the apparatus comprising:
   a communication circuitry configured to support the plurality of communication networks; and
   at least one processor configured to:
      receive an input corresponding to a request to perform an emergency call;
      in response to the receiving of the input, prior to performing the RAT search for the emergency call, determine whether a Subscriber Identity Module (SIM) card has been mounted to the terminal;
      in response to determining that the SIM card has been mounted to the terminal, perform the RAT search for at least one communication network based on a RAT priority stored in the terminal; and
      in response to determining that the SIM card has not been mounted to the terminal, determine at least one communication network which supports a voice telecommunication among the plurality of communication networks which the terminal supports in a communication-limited state in which a communication function of the terminal is limited, the determination excluding one or more communication networks which do not support the voice telecommunication among the plurality of communication networks, and perform the RAT search for the determined at least one communication network.

10. The apparatus of claim 9, wherein the communication-limited state corresponds to at least one of a SIM card un-mounted state, a Personal Identification Number (PIN) lock state, or a PIN Unlock Key (PUK) lock state.

11. The apparatus of claim 10, wherein, when the communication-limited state corresponds to at least one of the PIN lock state or the PUK lock state, the at least one processor is further configured:
   determine whether a most recently used network is a network which supports Circuit Switched (CS) voice telecommunication, based on information stored in the SIM card; and
   determine the at least one communication network which supports the CS voice telecommunication when the most recently used network is a network which does not support the CS voice telecommunication.

12. The apparatus of claim 11, wherein, when the most recently used network is determined to support the CS voice telecommunication, the at least one processor is further configured to perform the RAT search for the most recently used network.

13. The apparatus of claim 11, wherein the at least one communication network which supports the CS voice telecommunication comprises a communication network employing a CS scheme.

14. The apparatus of claim 9, wherein the at least one processor is further configured to perform the RAT search based on priorities assigned to the plurality of communication networks.

15. The apparatus of claim 14, wherein the at least one processor is further configured to camp on a cell of a corresponding communication network when the corresponding communication network is discovered among the plurality of communication networks.

16. The apparatus of claim 14 further comprising:
   electronic memory separate from the SIM card and configured to store the priorities assigned to the plurality of communication networks.

17. The apparatus of claim 16, wherein the stored network priority information is selected by a system designer.

18. A method of performing a Radio Access Technology (RAT) search for an emergency call in a terminal supported by a plurality of communication networks, the method comprising:
   receiving an input corresponding to a request to perform an emergency call;
   in response to the receiving of the input, prior to performing the RAT search for the emergency call, determining whether a Subscriber Identity Module (SIM) card has been mounted to the terminal;
   excluding one or more communication networks which do not support a Circuit Switched (CS) voice telecommunication among the plurality of communication networks in a communication-limited state in which a communication function of the terminal is limited; and
   performing the RAT search for at least one communication network which supports the CS voice telecommunication among the plurality of communication networks,
   wherein the communication-limited state corresponds to at least one of the SIM card un-mounted state, a Personal Identification Number (PIN) lock state, or a PIN Unlock Key (PUK) lock state.

19. The method of claim 18, wherein the priorities assigned to the plurality of communication networks are stored in memory of the terminal separate from the SIM card.

20. The method of claim 19, wherein the stored network priority information is predefined by a user.

* * * * *